(12) United States Patent
Uchida et al.

(10) Patent No.: US 7,052,017 B2
(45) Date of Patent: May 30, 2006

(54) ROTARY MACHINE WITH SEAL

(75) Inventors: Tatsuro Uchida, Yokohama (JP); Masataka Kikuchi, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 31 days.

(21) Appl. No.: 10/472,900

(22) PCT Filed: Feb. 28, 2002

(86) PCT No.: PCT/JP02/01870

§ 371 (c)(1),
(2), (4) Date: Sep. 25, 2003

(87) PCT Pub. No.: WO02/077500

PCT Pub. Date: Oct. 3, 2002

(65) Prior Publication Data

US 2004/0096319 A1    May 20, 2004

(30) Foreign Application Priority Data

Mar. 26, 2001 (JP) .............................. 2001-087435

(51) Int. Cl.
*F16J 15/447* (2006.01)
(52) U.S. Cl. ............... 277/420; 277/413; 415/174.5
(58) Field of Classification Search ............... 277/418, 277/419, 420, 422, 377, 379, 413; 415/174.5
See application file for complete search history.

(56) References Cited

U.S. PATENT DOCUMENTS

| 1,505,924 | A | * | 8/1924 | Warren | 277/418 |
|---|---|---|---|---|---|
| 2,123,818 | A | * | 7/1938 | Wegmann | 277/419 |
| 3,146,992 | A | * | 9/1964 | Miller | 415/12 |
| 3,806,136 | A | * | 4/1974 | Warner et al. | 277/373 |
| 3,971,563 | A | * | 7/1976 | Sugimura | 277/413 |
| 4,046,388 | A |   | 9/1977 | Meyer |   |
| 4,057,362 | A | * | 11/1977 | Schwaebel | 415/173.6 |
| 4,429,854 | A | * | 2/1984 | Kar et al. | 384/94 |
| 4,436,311 | A | * | 3/1984 | Brandon | 277/413 |
| 5,029,876 | A | * | 7/1991 | Orlando et al. | 277/419 |
| 5,094,551 | A | * | 3/1992 | Kitamura et al. | 384/518 |
| 5,224,714 | A | * | 7/1993 | Kimura et al. | 277/400 |
| 6,145,844 | A | * | 11/2000 | Waggott | 277/412 |
| 6,394,459 | B1 | * | 5/2002 | Florin | 277/303 |
| 6,543,992 | B1 | * | 4/2003 | Webster | 415/10 |

FOREIGN PATENT DOCUMENTS

| JP |   | 47-26772 Y1 |   | 8/1972 |
|---|---|---|---|---|
| JP |   | 52-109066 A |   | 9/1977 |
| JP |   | 58-206806 | * | 12/1983 |
| JP |   | 58-206806 A |   | 12/1983 |
| JP |   | 61-16209 A |   | 1/1986 |
| JP |   | 63-186904 U |   | 11/1988 |
| JP |   | 64-31262 U |   | 2/1989 |
| JP |   | 64-35001 | * | 2/1989 |
| JP |   | 2000-97350 | * | 4/2000 |

\* cited by examiner

*Primary Examiner*—Alison K. Pickard
(74) *Attorney, Agent, or Firm*—Foley & Lardner LLP

(57) ABSTRACT

The so-called comb-type labyrinth sealing device (S1) is disposed in a gap between a rotor blade (2), i.e. a rotating member, and a labyrinth packing (9), i.e. a stationary member. The sealing device (S1) has a plurality of sealing fins (F1, F2) arranged on the opposite sides of the gap opposite to each other. The sealing fins are axially spaced apart at unequal pitches, and hence a possibility that some of the clearances between the opposite sealing fins (F1, F2) decrease when a casing holding the labyrinth packing (9) and a rotor (1) are axially displaced relative to each other due to the difference in thermal expansion between the rotator and the casing increases.

6 Claims, 13 Drawing Sheets

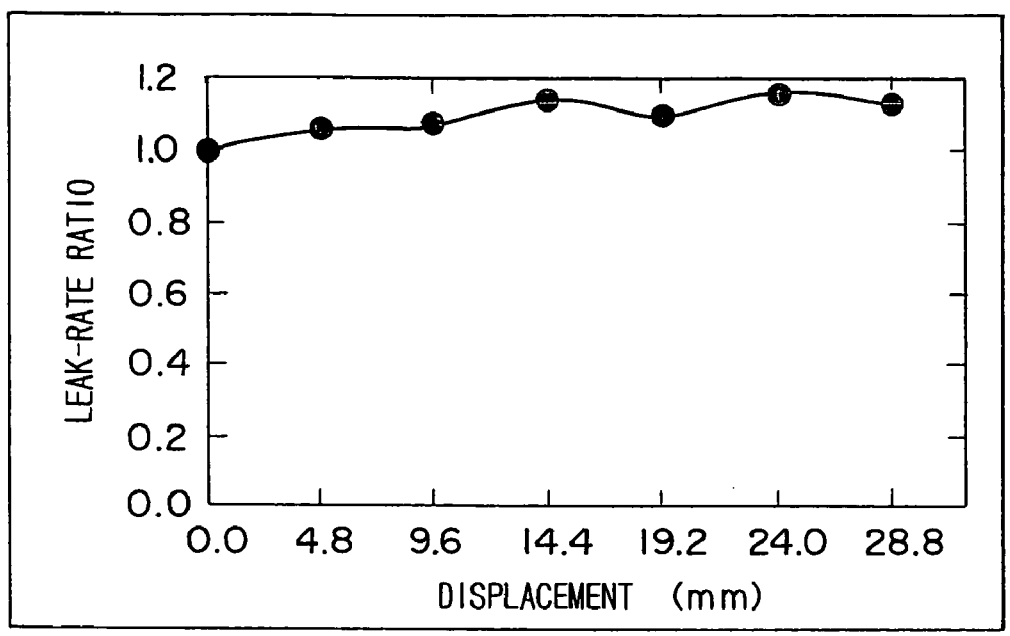
F I G. 2
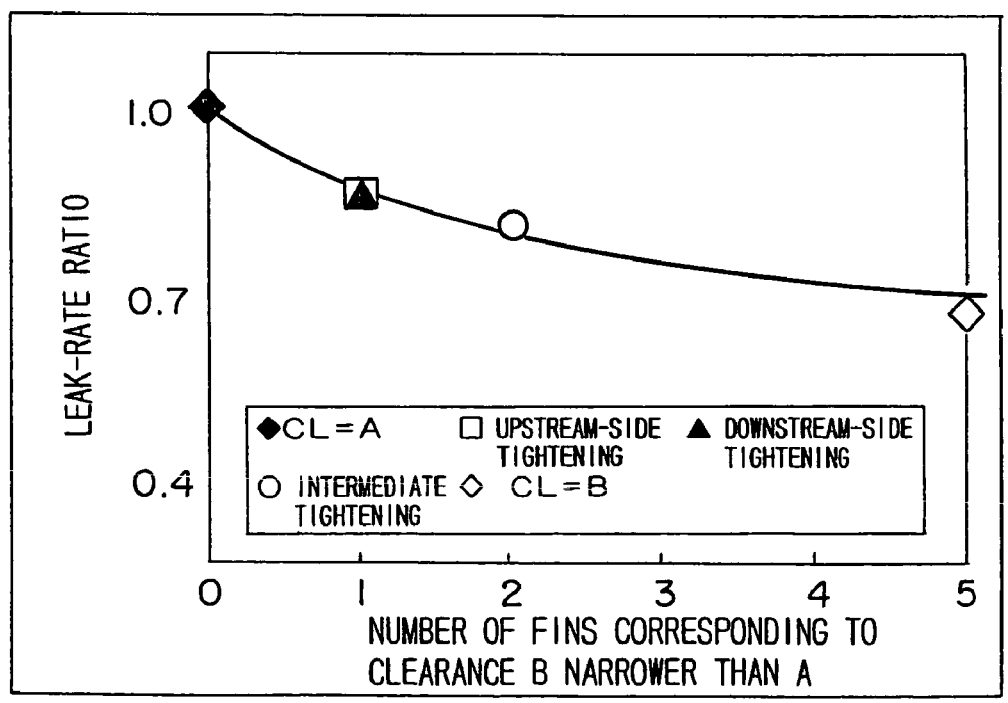
F I G. 3

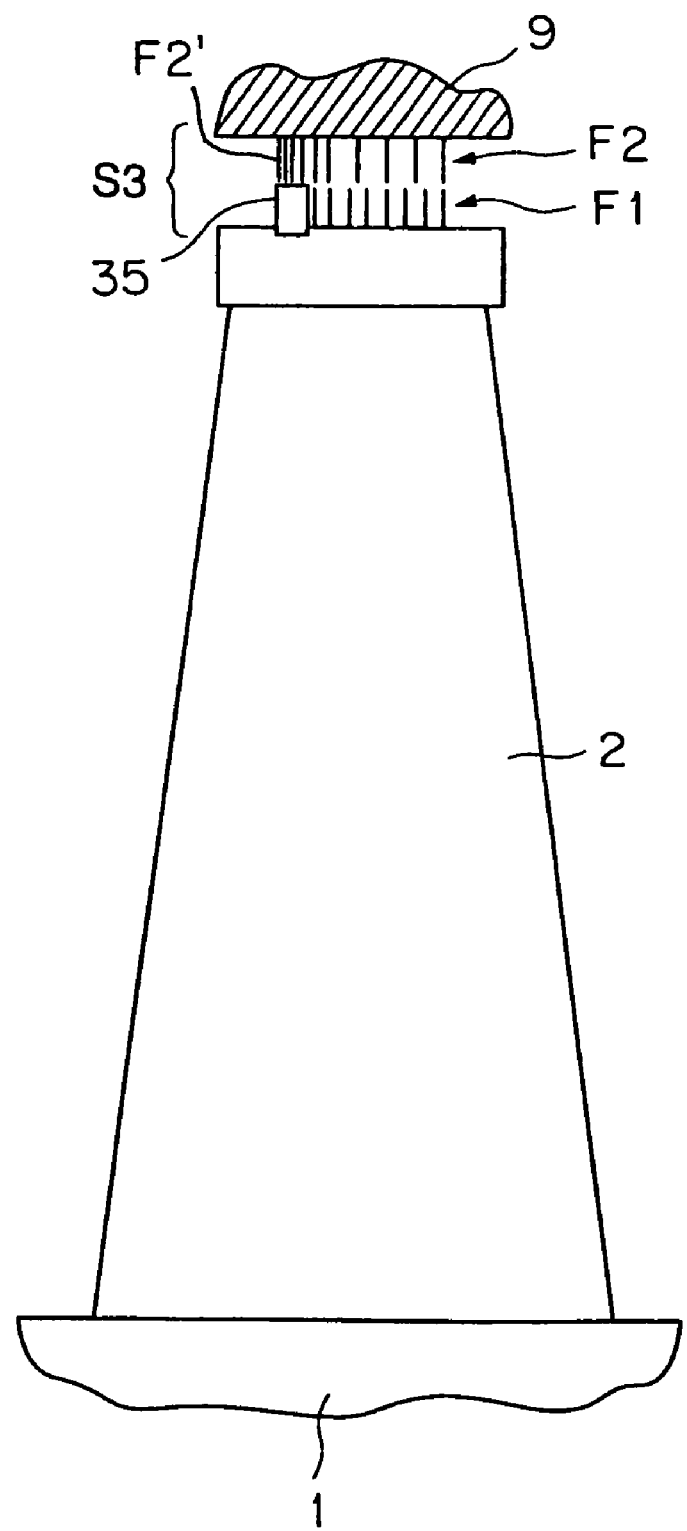
F I G. 5

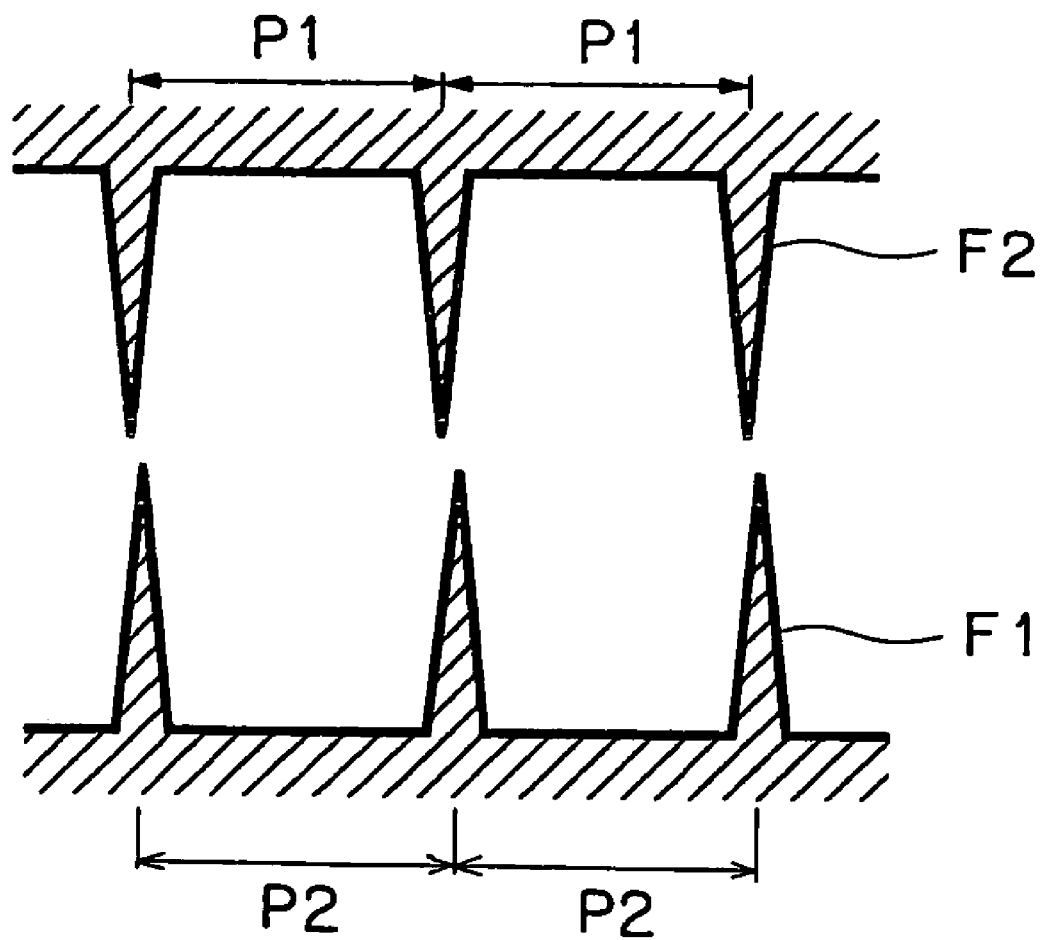
F I G. 10

ROTARY MACHINE WITH SEAL

TECHNICAL FIELD

The present invention relates to a rotary machine, such as an axial-flow turbine, and, more particularly, to improvements in a sealing device between stationary and rotating members of a rotary machine.

BACKGROUND ART

It has been desired to reduce, to the least possible extent, the leak rate of a working fluid that leaks through gaps between stationary and rotating members of rotary machines, such as axial-flow turbines including steam turbines and gas turbines.

FIG. 8 shows a general steam turbine, i.e. a rotary machine. This steam turbine has a turbine rotor 1 provided with rotor blades 2, i.e. rotating members, and a turbine casing 6 enclosing outer rings 3 of a nozzle diaphragm, stator blades (turbine nozzles) 4, and inner rings 5 of a nozzle diaphragm, i.e. stationary members. Opposite ends of the rotor 1 are supported in bearings 11. Noncontact sealing devices are interposed between each of the rotor blades 2 and each of the outer rings 3, and between the rotor 1 and each of the inner rings 5 to prevent the leakage of the working fluid.

FIG. 9 is an enlarged view of a part of FIG. 8 showing such a sealing device by way of example. Referring to FIG. 9, the outer ring 3 of the nozzle diaphragm holds a labyrinth packing 9 provided with a plurality of chip fins 7 extending toward the outer edge of the rotor blade 2. The inner ring 5 of the nozzle diaphragm 5 holds a labyrinth packing 10 provided with a plurality of sealing fins 8 extending toward the rotor 1.

The so-called hi-lo labyrinth sealing device, which is different from the sealing device shown in FIG. 9, has a protrusion disposed on one side, i.e. the rotating side or the stationary side, of a gap, and a plurality of sealing fins disposed on the other side of the gap. The sealing fins are arranged axially at equal pitches. The so-called comb-type labyrinth sealing device shown in FIG. 10 is used. The comb-type labyrinth sealing device shown in FIG. 10 has a plurality of sealing fins F1 and F2 disposed on the opposite sides of a gap, respectively, so as to extend toward each other. The fins F1 are arranged axially at equal pitches P2, and the fins F2 are arranged axially at equal pitches P1.

A rotary machine using a high-temperature working fluid, such as a steam turbine, undergoes temperature changes between starting and stopping and, consequently, the casing and the rotor of the rotary machine are displaced axially relative to each other due to the difference in thermal expansion, i.e. the difference in elongation, between the casing and the rotor. Generally, the rotor and the casing have different heat capacities, respectively, and the axial elongation of the casing is smaller than that of the rotor. Consequently, the rotor and the casing are displaced axially relative to each other.

In the comb-type sealing device as shown in FIG. 10, the sealing fins F1 and F2 do not come into contact with each other even if the rotor and the casing are displaced axially relative to each other due to the difference in thermal expansion between the rotor and the casing. On the other hand, the sealing performance of this comb-type sealing device is very high while the clearances between the corresponding sealing fins F1 and F2 are kept at a minimum.

When the sealing fins F1 and F2 are displaced axially relative each other due to the difference in thermal expansion between the rotor and the casing, the clearances increase and the sealing performance of the comb-type sealing device deteriorates sharply.

The deterioration of the sealing performance due to the difference between the rotor and the casing in thermal expansion may be compensated for by axially arranging many sealing fins. However, the possible number of stages of the sealing fins is limited because the blowby of the fluid flowing in a sealing part occurs if the number of the stages of the fins is greater than a certain limit.

The sealing effect of the sealing device shown in FIG. 9 is higher when the clearances between the edges of the tip fins 7 and the sealing fins 8, and the rotating members 2 and 1 are smaller. However, it is possible that the edges of the fins 7 and 8 come into contact with the rotating members 1 and 2, and there by the fins 7 and 8, and the rotating members 1 and 2 are damaged if the clearances are excessively small.

The variation of the clearances due to thermal deformation during the operation of the rotary machine is the principal factor of such a trouble resulting from contact between the members. Such a variation of clearances occurs mostly at the start and stop of the rotary machine or when the load on the rotary machine changes. Therefore, if the size of the clearance is determined on the basis of conditions for operations other than those for the rated operation of the rotary machine, the clearances increase unnecessarily during the rated operation and, consequently, the leak rate of the working fluid increases. A movable sealing mechanism capable of changing clearances in a sealing part according to the operating condition is necessary to solve such a problem. A rotary machine provided with such a movable sealing mechanism is disclosed in, for example, JP61-16209A (1986). In addition, FIGS. 11 to 14 show known movable sealing mechanisms.

FIGS. 11 and 12 show the so-called hi-lo labyrinth sealing device including ridges 15 formed on the side surface of a rotor 1. A labyrinth packing 10 integrally provided with fins 13 is mounted on the inner ring 5 of a nozzle diaphragm. A proper radial clearance e is maintained between the fin 13 and the ridge 15 by the resilience of a plate spring 14 interposed between the labyrinth packing 10 and the inner ring 5 of the nozzle diaphragm.

A hi-lo labyrinth sealing device shown in FIGS. 13 and 14 includes a labyrinth packing 10 provided with circumferential grooves 16, and coil springs 17 placed in the circumferential grooves 16 of the labyrinth packing 10. In this hi-lo labyrinth sealing device, the radial clearance e between a fin 13 and a ridge 15 is regulated by the pressure of steam ST supplied through a groove 18 to the labyrinth packing 10, and the resilience of the springs 17 pressing the labyrinth packing 10 radially outward.

In those movable sealing mechanisms, the labyrinth packing 10 is moved radially with respect to the rotor 1. Thus, those movable sealing mechanisms are not provided with any measures for coping with the relative axial displacement of the casing and the rotor due to the difference between the casing and the rotor in thermal expansion (thermal elongation).

Therefore, in the rotary machines provided with those sealing mechanisms are obliged to arrange the plurality of ridges 15 axially at comparatively big pitches to avoid contact between the fins 13 and the ridges 15. The axial arrangement of the ridges at big pitches reduces working fluid sealing effect.

DISCLOSURE OF THE INVENTION

The present invention has been made in view of the foregoing problems and it is therefore an object of the present invention to provide a rotary machine provided with a sealing device capable of suppressing the reduction of sealing performance resulting from the relative axial displacement of a rotary member and a stationary member due to the difference between the rotary member and the stationary member in thermal expansion.

According to the present invention, there is provided a rotary machine comprising: a rotating member supported for rotation about an axis of rotation; a stationary member surrounding the rotating member; and a sealing device disposed in a gap between the rotating member and the stationary member, wherein the sealing device includes a plurality of sealing fins arranged opposite to each other on the opposite sides of the gap, and at least the sealing fins arranged on one side of the gap are axially spaced apart at unequal pitches.

According to this rotary machine, at least the sealing fins on one side of the gap are axially spaced apart at unequal pitches, and hence a possibility increases that some of the clearances between the opposite sealing fins decrease when the rotating member and the stationary member are axially displaced relative to each other due to the difference in thermal expansion between the rotating member and the stationary member. Therefore, the sealing device of this rotary machine, as compared with the sealing device in which all the sealing fins are arranged at equal pitches, is capable of suppressing the deterioration of sealing performance resulting from the relative axial displacement of the rotating and the stationary member due to the difference in thermal expansion therebetween.

In this rotary machine, it is preferable to dispose a ridge opposite to at least one of the sealing fins, the ridge having a width greater than the thickness of the sealing fins along the axis of rotation. Thus, a possibility of maintaining a small clearance between the ridge and the sealing fin is higher than that of maintaining a small clearance between sealing fins when the rotating member and the stationary member are displaced axially relative to each other due to the difference in thermal expansion therebetween.

In this sealing device, the plurality of sealing fins are first fins opposite to the ridge, and second fins other than the first fins and it is preferable that the first fins are arranged at pitches smaller than those at which the second fins are arranged. Thus, the number of the first fns that are possible to maintain a small clearance can be increased to enhance the sealing performance.

In this rotary machine, the unequal pitches of the sealing fins can be determined by using, for example, an elementary function.

Preferably, this rotary machine further comprises a moving means for axially moving at least the sealing fins disposed on one side of the gap. The positions of the sealing fins can be corrected by axially moving the sealing fins by the moving means when the rotating member and the stationary member are displaced axially relative to each other due to the difference in thermal expansion (thermal contraction) therebetween. Thus, it is possible to further effectively suppress the deterioration of sealing performance resulting from the relative axial displacement of the rotating member and the stationary member due to the difference in thermal expansion (thermal contraction) therebetween.

According to the present invention, there is also provided a rotary machine comprising: a rotating member supported for rotation about an axis of rotation; a stationary member surrounding the rotating member; a sealing device provided on at least one of the rotating member and the stationary member, the sealing device having a sealing member projecting at a certain axial position into a gap between the rotating member and the stationary member; and a moving means for axially moving the sealing member.

According to this rotary machine, the position of the sealing device can be corrected when the rotating member and the stationary member are displaced axially relative to each other due to the difference in thermal expansion (thermal contraction) therebetween by axially moving the sealing member by the moving means. Thus, it is possible to suppress the deterioration of sealing performance resulting from the relative axial displacement of the rotating member and the stationary member due to the difference in thermal expansion (thermal contraction) therebetween.

In this rotary machine, the sealing device may further include a support member provided on the stationary member to support the sealing member, and the moving means may be a spring interposed between the stationary member and the support member.

Preferably, the spring is formed of a shape memory alloy expanding and contracting according to temperature changes. Thus, the sealing member can axially be moved by utilizing temperature changes at the start and at the stoppage of the rotary machine.

The shape memory alloy forming the spring is selected from, for example, Ti—Ni alloys, Cu—Zn alloys, Ni—Al alloys and Fe—Mn alloys. Springs formed of those shape memory alloys extend with the rise of temperature.

In one embodiment of this rotary machine, the spring is exposed to a high-temperature working fluid flowing through the gap between the rotating member and the stationary member and is disposed on an upstream side of the support member with respect to a flowing direction of the working fluid. When the spring is formed of a shape memory alloy that extends with the rise of temperature (contracts with the drop of temperature), the position of the sealing device can be corrected at the start of the rotary machine when the sealing device is relatively displaced upstream with respect to the flowing direction of the working fluid with the rise of temperature due to the difference in thermal expansion between the rotating member and the stationary member. The position of the sealing device can be corrected at the stoppage of the rotary machine when the sealing device is relatively displaced downstream with respect to the flowing direction of the working fluid with the drop of temperature due to the difference in thermal expansion between the rotating member and the stationary member.

In another embodiment of this rotary machine, the spring is exposed to a high-temperature working fluid flowing through the gap between the rotating member and the stationary member and is disposed on a downstream side of the support member with respect to a flowing direction of the working fluid. When the spring is formed of a shape memory alloy that extends with the drop of temperature (contracts with the rise of temperature), the position of the sealing device can be corrected at the stop of the rotary machine when the sealing device is relatively displaced downstream with respect to the flowing direction of the working fluid with the drop of temperature due to the difference in thermal expansion between the rotating member and the stationary member, and the position of the sealing device can be corrected at the start of the rotary machine when the sealing device is relatively displaced upstream with respect to the flowing direction of the working fluid with the rise of temperature due to the difference in thermal expansion between the rotating member and the stationary member.

BRIEF DESCRIPTION OF THE DRAWINGS

FIG. 2 is a graph showing the variation of working fluid leak-rate ratio with relative axial displacement of opposite sealing fins in a sealing device included in a general rotary machine;

FIG. 3 is a graph showing the variation of the leak rate of a working fluid with the number of fins forming a narrower clearance in a sealing device included in a general rotary machine;

FIG. 5 is a typical sectional view of an essential part of a rotary machine in a third embodiment according to the present invention;

FIG. 10 is a typical sectional view of a comb-type labyrinth sealing device included in a conventional rotary machine;

BEST MODE FOR CARRYING OUT THE INVENTION

Preferred embodiments of the present invention will be described with reference to the drawings. FIGS. 1, and 4 to 7 show rotary machines in preferred embodiment according to the present invention.

First Embodiment

Figure 1:
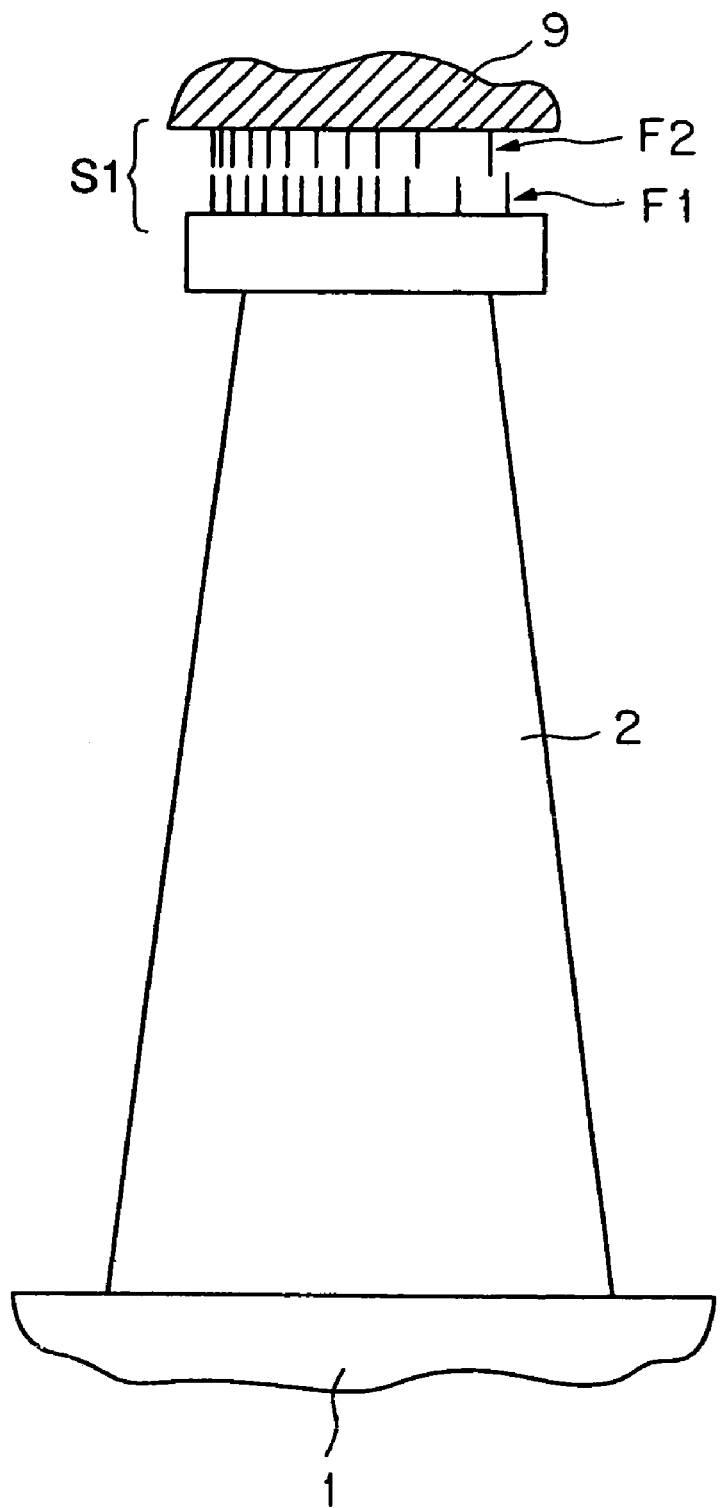
FIG. 1 is a typical sectional view of an essential part of a rotary machine in a first embodiment according to the present invention.
Figure 8:
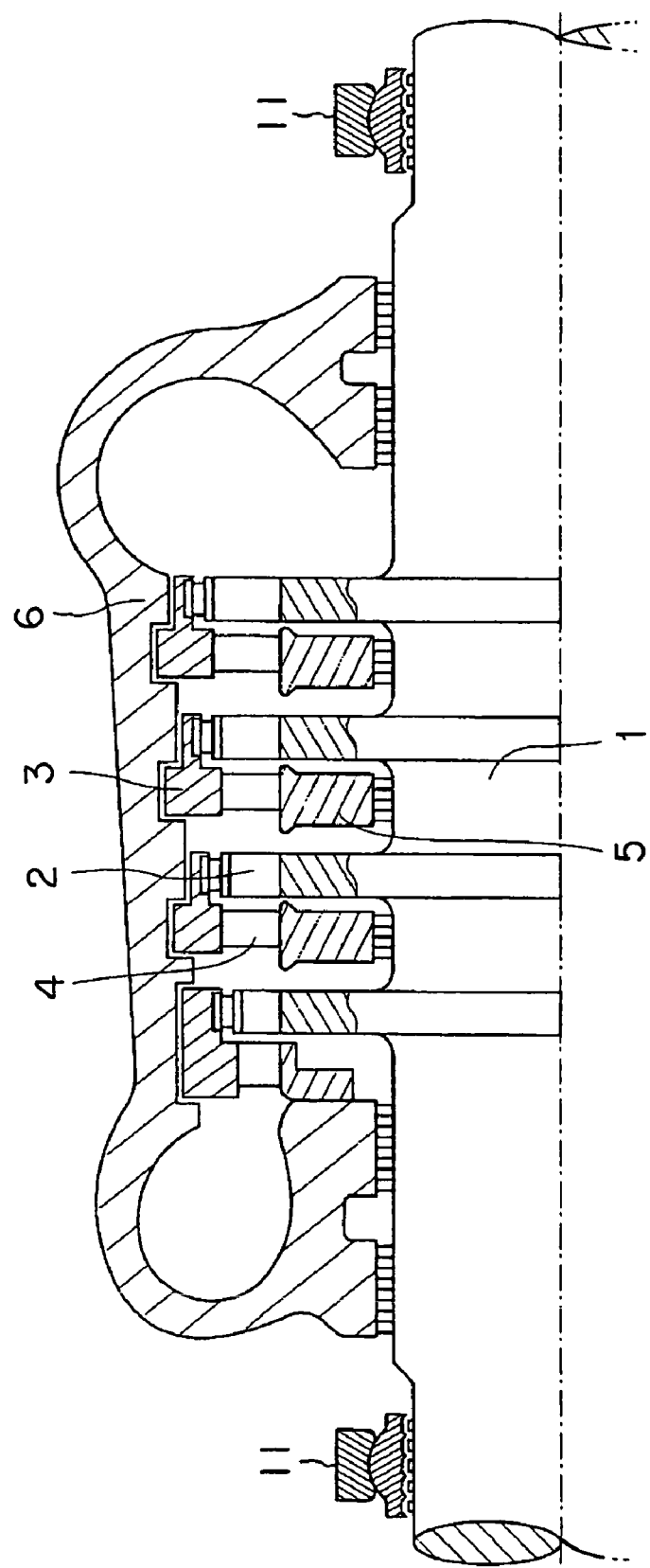
FIG. 8 is a half longitudinal sectional view of a general steam turbine, i.e. a rotary machine.
Figure 9:
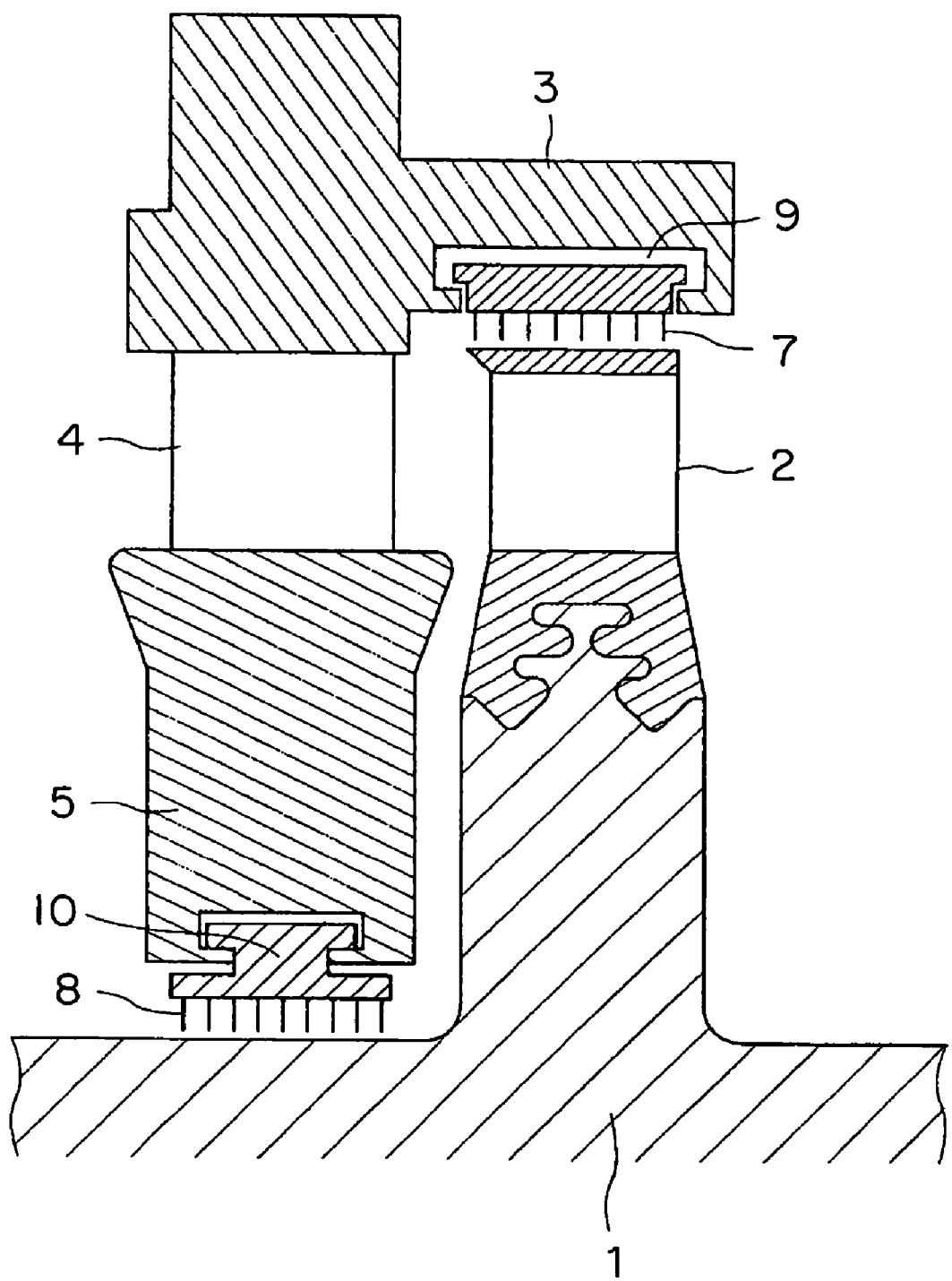
FIG. 9 is an enlarged view of a part of the steam turbine shown in FIG. 8.
Figure 11:
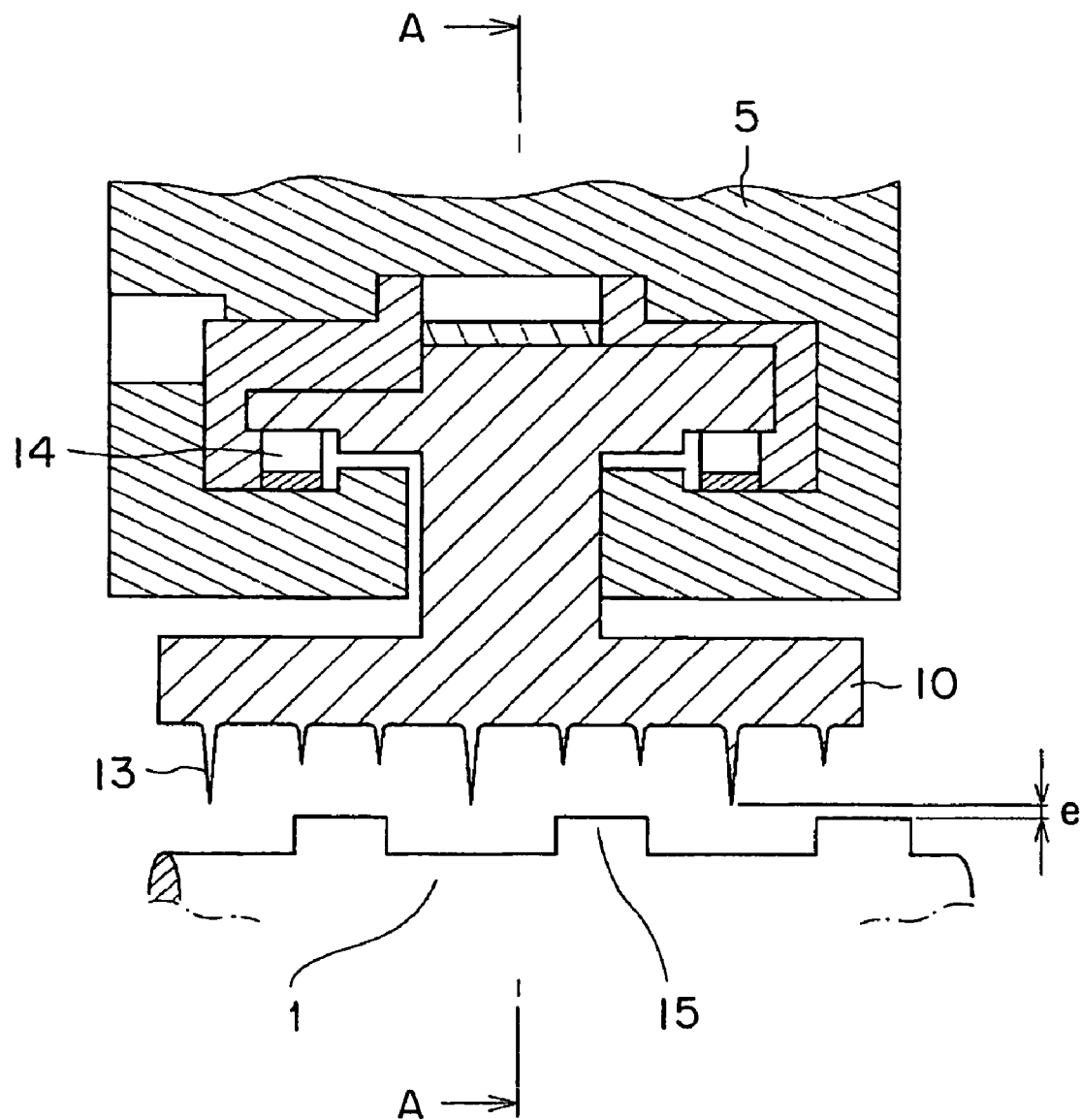
FIG. 11 is a longitudinal sectional view of an essential part of a rotary machine provided with a conventional sealing device.
Figure 12:
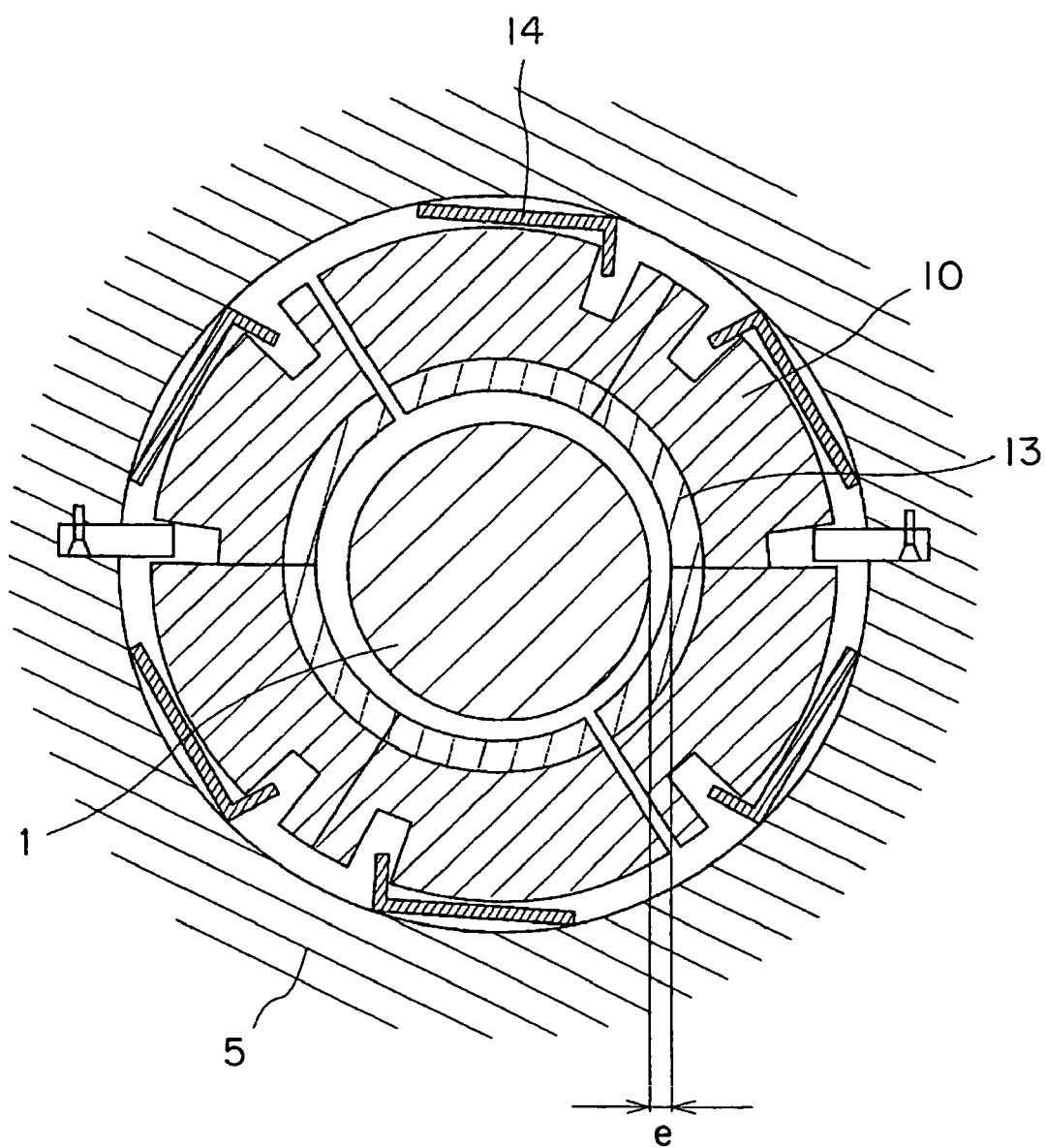
FIG. 12 is a sectional view taken on the line A—A in FIG. 11.
Figure 13:
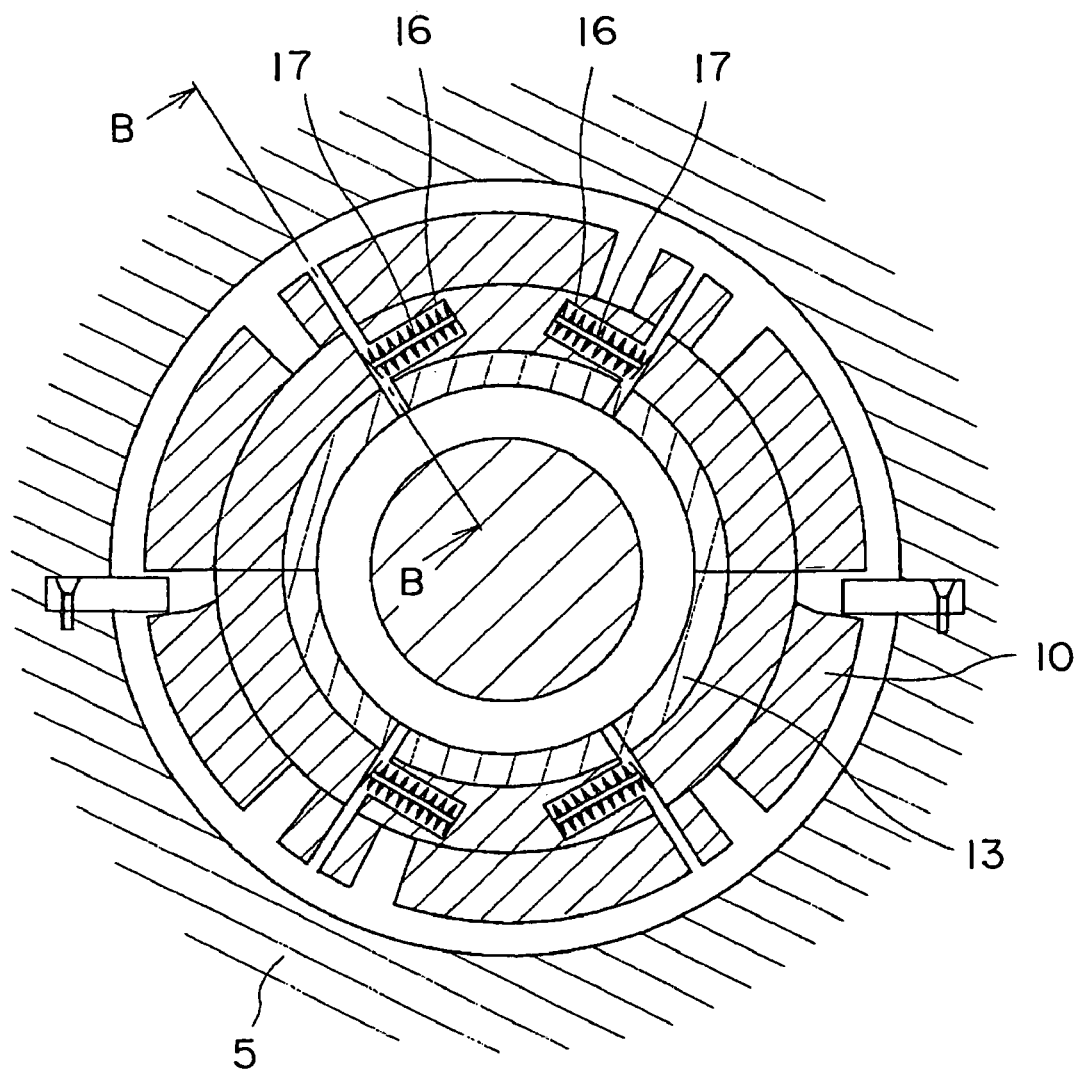
FIG. 13 is a longitudinal sectional view of an essential part of a rotary machine provided with another conventional sealing device.
Figure 14:
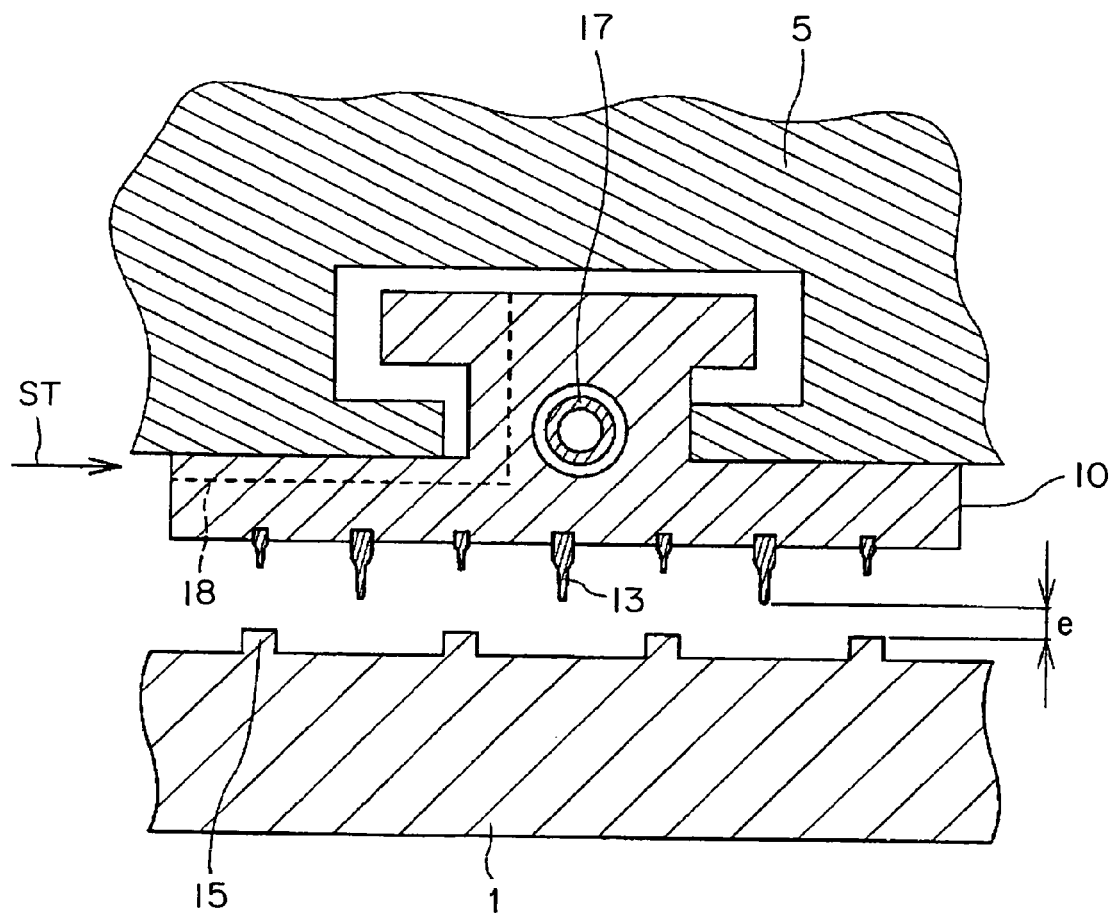
FIG. 14 is a sectional view taken on the line B—B in FIG. 13.

A rotary machine in a first embodiment according to the present invention will be described with reference to FIG. 1. FIG. 1 shows an essential part of the rotary machine in the first embodiment, such as an axial-flow turbine. The rotary machine has a rotor 1 supported for rotation about an axis of rotation and provided with a rotor blade 2, i.e. a rotating member, and a labyrinth packing 9, i.e. a stationary member, surrounding the rotor 1. The labyrinth packing 9 is held on an outer ring 3 of a nozzle diaphragm mounted on a casing 6 (FIGS. 8 and 9). A comb-type labyrinth sealing device S1 is disposed in a gap between the outer edge of the rotor blade 2 and the labyrinth packing 9.

The labyrinth sealing device S1 has a plurality of sealing fins F1 and F2 arranged opposite to each other on the opposite sides of the gap, respectively. The sealing fins F1 and F2 are axially spaced apart at unequal pitches. More specifically, the sealing fins F1 and F2 of the rotary machine in the first embodiment are arranged such that the pitch between the adjacent sealing fins increases gradually in one axial direction.

Since the sealing fins are axially spaced apart at unequal pitches, a possibility that some of the clearances between the opposite sealing fins F1 and F2 decrease when the rotator 1 and the casing 6 (FIG. 8) are axially displaced relative to each other due to the difference in thermal expansion between the rotor 1 and the casing 6 increases. Therefore, the sealing device of the rotary machine in the first embodiment, as compared with the sealing device in which all the sealing fins are arranged at equal pitches, is capable of suppressing the deterioration of sealing performance resulting from the relative axial displacement of the rotor 1 and the casing 6 due to the difference in thermal expansion between the rotor 1 and the casing 6.

The labyrinth sealing device S1 differs from the conventional labyrinth sealing device only in the arrangement of the sealing fins. Thus, the labyrinth sealing device S1 can be obtained through the improvement of the sealing performance of the conventional labyrinth sealing device without entailing much increase in the manufacturing cost, and is capable of improving the performance of the rotary machine.

The effect of the first embodiment will be verified with reference to graphs shown in FIGS. 2 and 3.

FIG. 2 is a graph showing the variation of working fluid leak-rate ratio with relative axial displacement of opposite sealing fins in a sealing device included in a general rotary machine. The working fluid leak-rate ratios are ratios of leak rates to that when the relative axial displacement is 0.0 mm. Sealing fins on the side of a rotating member are axially spaced apart at equal pitches and those on the side of a stationary member are axially spaced apart at equal pitches different from those between the sealing fins on the side of the rotating member. As obvious from FIG. 2, the working fluid leak-rate ratio has a general tendency to increase with the increase of the relative axial displacement, and increase in the working fluid leak-rate ratio is suppressed or the working fluid leak-rate ratio decreases at relative axial displacements of about 9.6, about 19.2 and about 28.8 mm. It is inferred that such a mode of variation of the working fluid leak-rate ratio occurs because the sealing fins on the side of the rotating member and those on the side of the stationary member are arranged at different pitches, respectively, and hence small clearances are formed between some of the opposite sealing fins when the relative axial displacement is equal to an integral multiple of 9.6 mm.

FIG. 3 is a graph showing the variation of working fluid leak-rate ratio with the number N of fins forming a narrower clearance B (=A/2, A is a clearance formed by the rest of the sealing fins) in a sealing device included in a general rotary machine. The working fluid leak-rate ratios are ratios of leak rates to that when the number N=0. The number of the sealing fins on the side of the rotating member and that of the sealing fins on the side of the stationary member are five. In FIG. 3, "CL=A" denotes a state where all the sealing fins are arranged so that all the clearances between the opposite sealing fins are equal to the clearance A, "CL=B" denotes a state where all the sealing fins are arranged so that all the clearances between the opposite sealing fins are equal to the clearance B=A/2, "Upstream-side tightening" denotes a state where only the clearance between one opposite pair of the sealing fins at the upstream end, with respect to the flowing direction of the working fluid, of the arrangement of the sealing fins is B=A/2, and the clearances between the other four opposite pairs of sealing fins are A. "Downstream-side tightening" denotes a state where only the clearance between one opposite pair of the sealing fins at the downstream end, with respect to the flowing direction of the working fluid, of the arrangement of the sealing fins is B=A/2, and the clearances between the other four opposite pairs of sealing fins are A. "Intermediate tightening" denotes a state where the clearances between the second and the fourth opposite pairs of sealing fins, from the upstream side with respect to the flowing direction of the working fluid are B=A/2, and the clearances between the other three opposite pairs of sealing fins are A. The graph shown in FIG. 3 indicates that the working fluid leak-rate ratio decreases and sealing performance is enhanced with the increase of the number of the sealing fins forming the narrower clearances when the total number of the sealing fins is fixed.

As apparent form the foregoing description, according to the first embodiment, a possibility increases that some of the clearances between the opposite sealing fins decrease, and thereby the deterioration of the sealing performance resulting from the relative axial displacement of the rotor blade 2 and the labyrinth packing 9 due to the difference in thermal expansion can be suppressed. In the sealing device relevant to the data shown in FIG. 2, the sealing fins on the rotating member are axially spaced apart at equal pitches, and the sealing fins on the stationary member are axially spaced at equal pitches different from those at which the sealing fins on the rotating member are spaced apart. On the other hand, the sealing fins of the sealing device included in the rotary machine in the first embodiment are axially spaced apart at the unequal pitches. The sealing device having the fins axially spaced apart at the unequal pitches in the first embodiment is more effective in increasing a possibility that some of the clearances between the opposite sealing fins decreases than the sealing device relevant to the data shown in FIG. 2.

Second Embodiment

Figure 4:
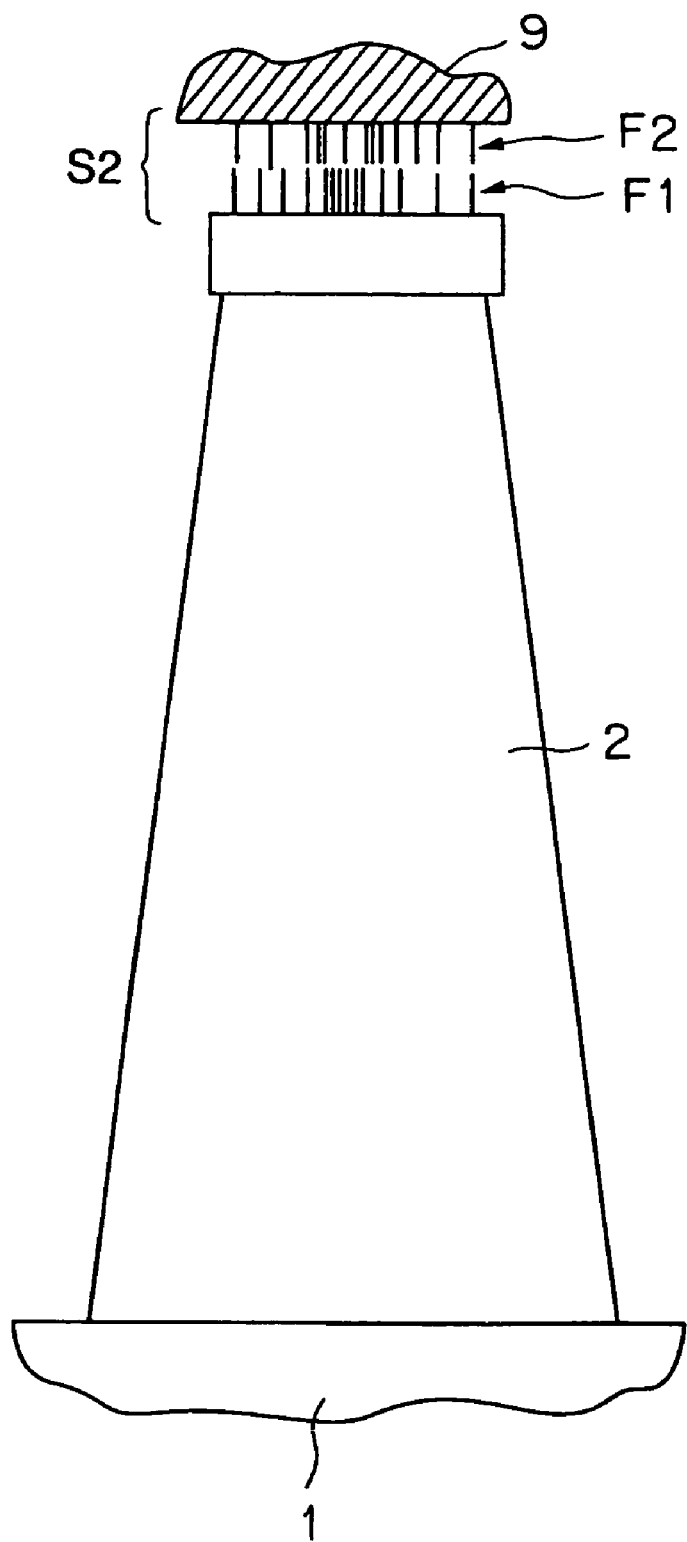
FIG. 4 is a typical sectional view of an essential part of a rotary machine in a second embodiment according to the present invention.

A rotary machine in a second embodiment according to the present invention will be described with reference to FIG. 4. The rotary machine in the second embodiment is provided with a labyrinth sealing device S2. The labyrinth sealing device S2 is the same in construction as the labyrinth sealing device S1 in the first embodiment shown in FIG. 1, except that the labyrinth sealing device S2 differs from the labyrinth sealing device S1 in the arrangement of its sealing fins F1 and F2.

In the sealing device S2 included in the rotary machine in the second embodiment, the sealing fins F1 on the side of a rotor blade 2 are axially spaced apart at unequal pitches such that the pitches decrease from both ends toward the middle of the row of the sealing fins F1. The sealing fins F2 on the side of a labyrinth packing 9 are axially spaced apart at unequal pitches such that the pitches decrease from one end toward the middle of the row of the sealing fins F2, increase in the middle of the row, decrease again in the middle of the row, and then increase toward the other end of the row.

The sealing device included in the rotary machine in the second embodiment provided with the sealing fins F1 and F2 axially spaced apart at the unequal pitches, similarly to the sealing device in the first embodiment, is capable of suppressing the deterioration of sealing performance resulting from the relative axial displacement of the rotor blade 2 and the labyrinth packing 9 due to the difference in thermal expansion.

Modifications of the First and the Second Embodiment

Although the sealing fins F1 and F2 are arranged at the unequal pitches on the opposite side, respectively, of the gap in the first and the second embodiment, the effect of the present invention can be achieved by arranging only either the sealing fins F1 or the sealing fins F2 at the unequal pitches on one side of the gap.

Third Embodiment

A rotary machine in a third embodiment according to the present invention will be described with reference to FIG. 5. The rotary machine in the third embodiment is provided with a labyrinth sealing device S3. The labyrinth sealing device S3 differs from the labyrinth sealing device S1 in the first embodiment shown in FIG. 1 in that a ridge 35 is formed in the outer edge of a rotor blade 2 and some of the sealing fins F2 are disposed opposite to the ridge 35. The ridge 35 has a width greater than the thickness of sealing fins F1 and F2 (F2') along the axis of rotation. The labyrinth sealing device S3 is similar in other respects to the labyrinth sealing device S1 included in the rotary machine in the first embodiment.

The sealing fins F1 on the rotor blade 2 provided with the ridge 35 are axially space apart substantially at equal pitches. Pitches between the sealing fins F2' (first sealing fins) opposite to the ridge 35 among the sealing fins F2 are smaller than those between the other sealing fins F2 (second sealing fins).

A possibility that the clearance between the ridge 35 and the sealing fins F2' facing the ridge 35 remains smaller than those between the sealing fins F1 and F2 is high when the rotor blade 2 and the labyrinth packing 9 are displaced axially relative to each other due to the difference in thermal expansion. Accordingly, the capability of the labyrinth sealing device S3 to suppress the deterioration of sealing performance due to the relative axial displacement of the rotating member and the stationary member is higher than those of the labyrinth sealing devices S1 and S2 in the first and the second embodiment.

Since the pitches between the sealing fins F2' facing the ridge 35 are smaller than those between the other sealing fins F2, an increased number of the sealing fins F2' can be arranged opposite to the ridge 35 to improve the sealing performance of the labyrinth sealing device S3.

The labyrinth sealing device S3 includes the single ridge 35 on the rotor blade 2, a plurality of ridges 35 may be formed on the rotor blade 2 or the labyrinth packing 9. Although the four sealing fins F2 are disposed opposite to the ridge 35 in FIG. 5, any suitable number of the sealing fins F1 or the sealing fins F2 may be disposed opposite to the ridge 35.

Modifications of the First to the Third Embodiment

Although the sealing fins F1 and F2 are arranged in axial rows such that fin density in one or two parts of the axial row is higher than those in other parts of the axial row in the labyrinth sealing devices S1, S2 and S3 in the first to the third embodiment, the sealing fins F1 and F2 may be arranged in axial rows such that fin density in more than two parts of the axial row may be higher than those in other parts of the axial row. The unequal pitches between the sealing fins F1 and F2 may be determined by using an elementary function, such as an exponential function or a trigonometric function. When an exponential function is used, it is desirable that coefficient of exponent is not smaller than 1.0 and less than 10.

Although the labyrinth sealing devices S1, S2 and S3 are disposed in the gap between the labyrinth packing 9 mounted on the outer ring 3 of the nozzle diaphragm and the outer edge of the rotor blade 2 in the first to the third embodiment, the labyrinth sealing devices S1, S2 and S3 may be disposed in a gap between the outer ring of the nozzle diaphragm and the stator blade or a casing body and the rotor for the same effect.

Although the sealing fins F1 and F2 of the labyrinth sealing devices in the first to the third embodiment are extended perpendicularly to the axis of rotation, the sealing fins F1 and F2 may be inclined upstream to the axis of rotation for the further improvement of sealing performance.

Fourth Embodiment

Figure 6:
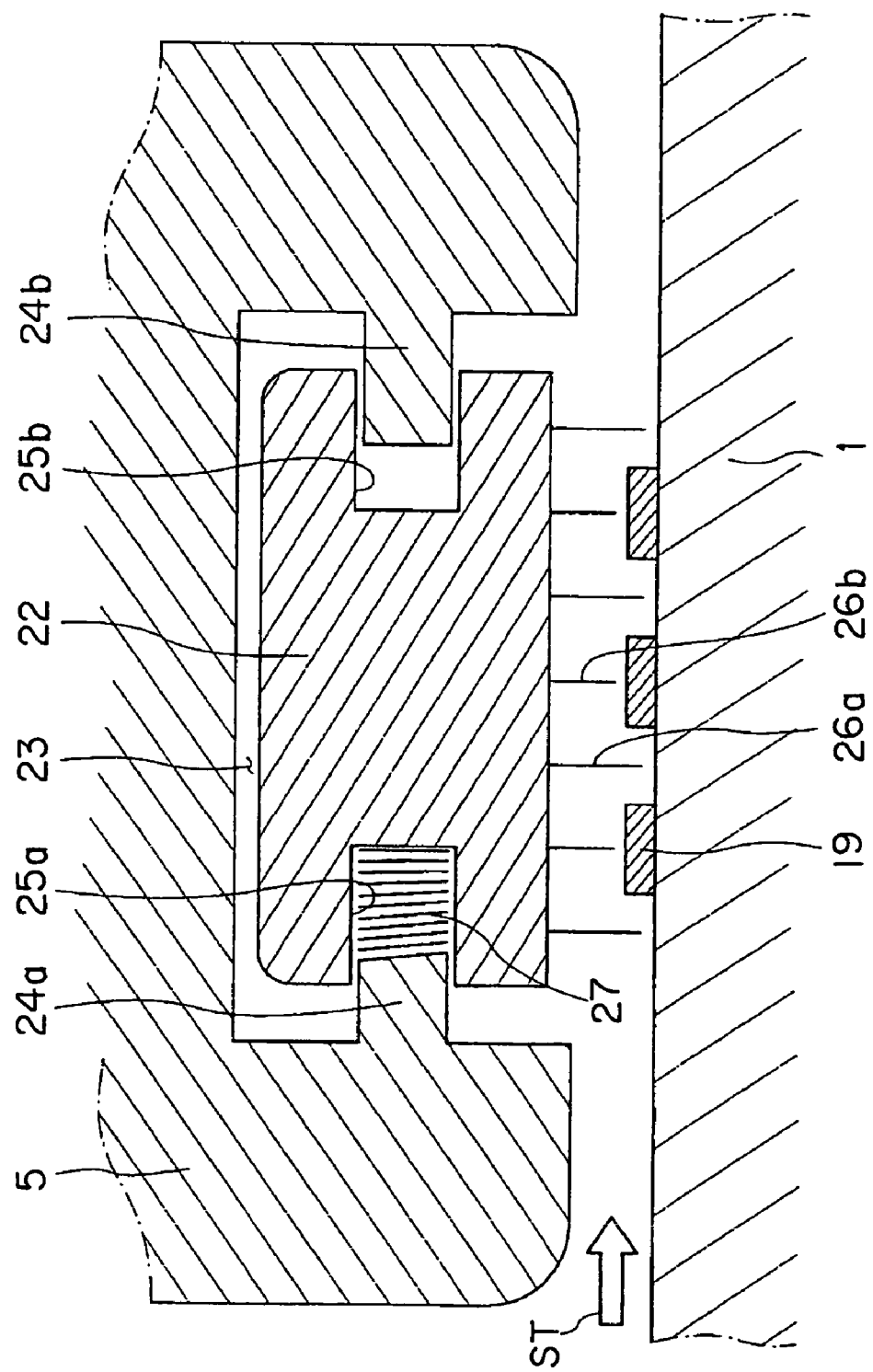
FIG. 6 is a typical sectional view of an essential part of a rotary machine in a fourth embodiment according to the present invention.

A rotary machine in a fourth embodiment according to the present invention will be described with reference to FIG. 6 showing an essential part of the rotary machine, such as an axial-flow turbine. This rotary machine includes a rotor 1 supported for rotation about an axis of rotation, and an inner ring 5 of a nozzle diaphragm provided with a labyrinth packing 22, i.e. a stationary member, surrounding the rotor 1. The inner ring 5 is held on a casing 6 via an outer ring 3 of the nozzle diaphragm and a stator blade 4 (FIGS. 8 and 9).

A labyrinth sealing device generally called a hi-lo labyrinth sealing device is disposed in a gap between the labyrinth packing 22 and the rotor 1. The labyrinth sealing device includes a plurality of long sealing fins (sealing members) 26a and short sealing fins (sealing members) 26b held on the labyrinth packing (support member) 22, and a plurality of ridges 19 formed on the side surface of the rotor 1. The long sealing fins 26a and the short sealing fins 26b are arranged alternately so as to project toward the rotor 1. The ridges 19 of the rotor 1 are arranged opposite the short sealing fins 26b. For example, the sealing fins 26a and 26b and the ridges 19 are arranged axially at equal pitches.

The inner ring 5 of the nozzle diaphragm is provided with a circumferential groove 23 for holding the labyrinth packing 22 therein. Annular ridges 24a and 24b project from the opposite side surfaces of the groove 23, respectively. The labyrinth packing 22 is provided with grooves. 25a and 25b in its opposite axial end surfaces, respectively. The ridges 24a and 24b are received in the grooves 25a and 25b, respectively. A coil spring 27 is placed in the groove 25a on the upstream side with respect to the flowing direction of steam ST, i.e. hot working fluid. The coil spring 27 serves as a moving means for axially moving the labyrinth packing 22 to move the fins 26a and 26b axially relative to the inner ring 5 of the nozzle diaphragm.

The spring 27 is formed of a shape memory alloy and capable of extending when its temperature rises and of contracting when its temperature falls. Suitable shape memory alloys for forming the spring 27 are Ti—Ni alloys, Cu—Zn alloys, Ni—Al alloys and Fe—Mn alloys.

The operation of the rotary machine thus constructed will be explained. Both the rotor 1 and the casing 6 (FIG. 8) extend downstream with respect to the flowing direction of steam ST as temperature rises at the start of the rotary machine. The rate of thermal extension of the casing 6 is lower than that of the rotor 1 due to the difference in heat capacity between the rotor 1 and the casing 6. Consequently, the inner ring 5 of the nozzle diaphragm, which is held on the casing 6 via the outer ring 3 of the nozzle diaphragm and the stator blade 4 (FIGS. 8 and 9), moves upstream with respect to the flowing direction of steam ST relative to the rotor 1 by a distance corresponding to the difference between the respective thermal extensions of the rotor 1 and the casing 6.

In this state, the spring 27 placed in the groove 25a on the upstream side of the labyrinth packing 22 with respect to the flowing direction of steam ST is exposed to steam ST in the groove 23 and is heated by steam ST. Consequently, the length of the spring 27 increases as its temperature rises to move the labyrinth packing 22 downstream with respect to the flowing direction of steam ST relative to the inner ring 5 of the nozzle diaphragm. Thus, the positions of the fins 26a and 26b are corrected to compensate for the upstream displacement of the sealing fins 26a and 26b due to the difference in thermal expansion between the rotor 1 and the casing 6.

Both the rotor 1 and the casing 6 (FIG. 8) contract upstream with respect to the flowing direction of steam ST as temperature falls at the stoppage of the rotary machine. The rate of thermal contraction of the casing 6 is lower than that of the rotor 1 due to the difference in heat capacity between the rotor 1 and the casing 6. Consequently, the inner ring 5 of the nozzle diaphragm moves downstream with respect to the flowing direction of steam ST relative to the rotor 1.

In this state, the spring 27 placed in the groove 25a on the upstream side of the labyrinth packing 22 with respect to the flowing direction of steam ST moves the labyrinth packing 22 upstream with respect to the flowing direction of steam ST relative to the inner ring 5 of the nozzle diaphragm as its temperature falls. Thus, the positions of the fins 26a and 26b are corrected to compensate for the downstream displacement of the sealing fins 26a and 26b due to the difference in thermal contraction between the rotor 1 and the casing 6.

Fifth Embodiment

Figure 7:
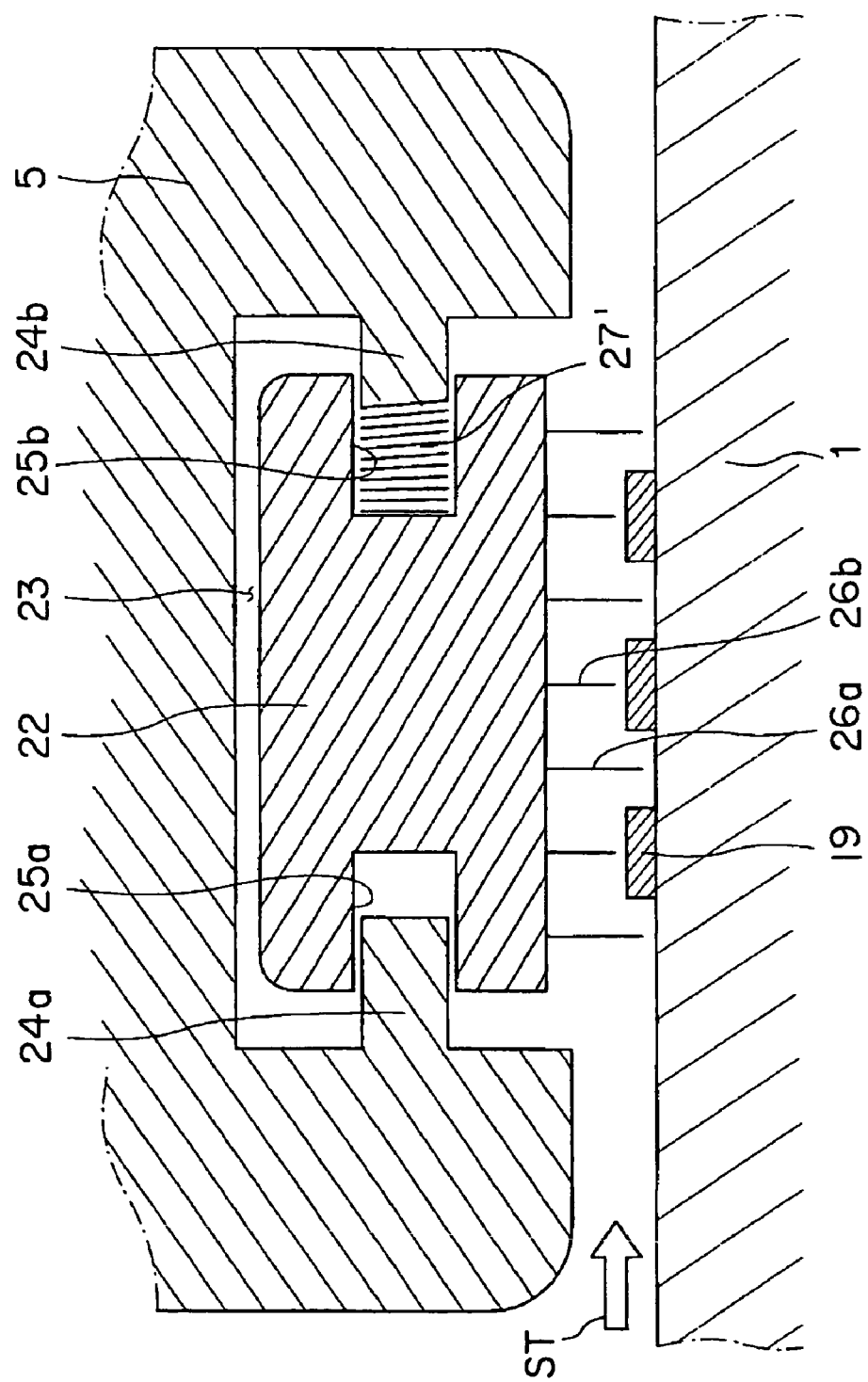
FIG. 7 is a typical sectional view of an essential part of a rotary machine in a fifth embodiment according to the present invention.

A rotary machine in a fifth embodiment according to the present invention will be described with reference to FIG. 7. This rotary machine differs from the rotary machine in the fourth embodiment in that a coil spring 27' is placed in a groove 25b, on the downstream side with respect to the flowing direction of steam ST, formed in a labyrinth packing 22 and the coil spring 27' is formed of a shape memory alloy capable of contracting when its temperature rises and of extending when its temperature falls. The rotary machine in the fifth embodiment is the same in other respects as the rotary machine in the fourth embodiment shown in FIG. 6.

At the start of the rotary machine, the spring 27' contracts as its temperature rises to move the labyrinth packing 22 downstream with respect to the flowing direction of steam ST relative to the inner ring 5 of the nozzle diaphragm. Thus, the positions of the fins 26a and 26b are corrected to compensate for the upstream displacement of the sealing fins 26a and 26b due to the difference in thermal expansion between the rotor 1 and the casing 6.

At the stoppage of the rotary machine he spring 27' moves the labyrinth packing 22 upstream with respect to the flowing direction of steam ST relative to the inner ring 5 of the nozzle diaphragm as its temperature falls. Thus, the positions of the fins 26*a* and 26*b* are corrected to compensate for the downstream displacement of the sealing fins 26*a* and 26*b* due to the difference in thermal contraction between the rotor 1 and the casing 6.

Modifications of the Fourth and the Fifth Embodiment

Although the labyrinth sealing device is disposed in the gap between the inner ring 5 of the nozzle diaphragm and the rotor 1 in the fourth and the fifth embodiment, the labyrinth sealing device may be disposed in a gap between the outer ring of the nozzle diaphragm and a rotor blade or in a gap between the casing body and the rotor.

Although the labyrinth sealing devices in the fourth and the fifth embodiment include the springs 27 and 27' formed of the shape memory alloys, as the moving means, respectively, the moving means may be a spring formed of any other material, and a spring other than the coil spring may be used. The labyrinth sealing device of the present invention may employ, for example, a hydraulic cylinder actuator instead of the spring as a moving means.

Other Embodiments

One of the first to the third embodiment, and either the fourth or the fifth embodiment may be used in combination. In the labyrinth sealing devices employed in the first to the third embodiment may be provided with the moving means employed in the fourth or the fifth embodiment to move the sealing fins axially. Thus, the relative axial displacement of the sealing fins due to the difference in thermal expansion (contraction) between the rotating member and the stationary member can be corrected to suppress the deterioration of sealing performance.

The invention claimed is:

1. A rotary machine comprising:
a rotating member supported for rotation about an axis of rotation;
a stationary member surrounding the rotating member; and
a sealing device disposed in a gap between the rotating member and the stationary member,
the sealing device including:
a plurality of sealing fins arranged opposite to each other on the opposite sides of the gap; and
a ridge disposed opposite to at least two of the sealing fins, the ridge having a width greater than a thickness of the sealing fins along the axis of rotation,
wherein at least the sealing fins arranged on one side of the gap are axially spaced apart at unequal pitches,
wherein the plurality of sealing fins includes a set of at least two first fins opposite to the ridge and second fins other than the first fins, the second fins being opposite to each other, and
wherein the first fins are arranged at pitches smaller than those at which the second fins are arranged.

2. The rotary machine according to claim 1, further comprising a spring formed of a shape memory alloy expanding and contracting according to temperature changes for axially moving at least the sealing fins disposed on one side of the gap.

3. The rotary machine according to claim 2, wherein the shape memory alloy forming the spring is selected from Ti—Ni alloys, Cu—Zn alloys, Ni—Al alloys and Fe—Mn alloys.

4. The rotary machine according to claim 2, the spring is exposed to a high-temperature working fluid flowing through the gap between the rotating member and the stationary member and is disposed, on an upstream side of the support member with respect to a flowing direction of the working fluid.

5. The rotary machine according to claim 2, wherein the spring is exposed to a high-temperature working fluid flowing through the gap between the rotating member and the stationary member and is disposed on a downstream side of the support member with respect to a flowing direction of the working fluid.

6. The rotary machine according to claim 1, wherein the sealing fins are inclined upstream with respect to the axis of rotation.

* * * * *